United States Patent [19]
Watanabe et al.

[11] Patent Number: 5,723,553
[45] Date of Patent: Mar. 3, 1998

[54] PROCESS OF PRODUCING POLYMER USING A POLYMER SCALE DEPOSITION PREVENTIVE AGENT

[75] Inventors: Mikio Watanabe, Ibaraki-ken; Toshihide Shimuzu, Urayasu, both of Japan

[73] Assignee: Shin-Etsu Chemical Co., Ltd., Tokyo, Japan

[21] Appl. No.: 559,451

[22] Filed: Nov. 15, 1995

[30] Foreign Application Priority Data

Nov. 15, 1994 [JP] Japan ................ 6-305581

[51] Int. Cl.$^6$ ............................... C08F 2/02
[52] U.S. Cl. ........................... 526/62; 526/344
[58] Field of Search ....................... 526/62, 344

[56] References Cited

U.S. PATENT DOCUMENTS

| | | | |
|---|---|---|---|
| 4,016,341 | 4/1977 | Ogawa et al. | 526/62 |
| 4,090,015 | 5/1978 | Koyanagi et al. | 526/62 |
| 4,098,972 | 7/1978 | Ogawa et al. | 526/62 |
| 4,165,419 | 8/1979 | Suzuki et al. | 526/62 |
| 4,173,696 | 11/1979 | Koyanagi et al. | 526/62 |
| 4,451,625 | 5/1984 | Cheng et al. | 526/62 |
| 4,542,195 | 9/1985 | Shimizu et al. | 526/62 |
| 4,612,354 | 9/1986 | Shimizu et al. | 526/62 |
| 5,053,466 | 10/1991 | Shimizu et al. | 526/62 |
| 5,115,051 | 5/1992 | Shimizu et al. | 526/62 |
| 5,354,817 | 10/1994 | Usuki et al. | 526/62 |

FOREIGN PATENT DOCUMENTS

| | | |
|---|---|---|
| 0 042 725 | 12/1981 | European Pat. Off. . |
| 2 207 148 | 6/1974 | France . |

OTHER PUBLICATIONS

Chemical Abstracts, AN 115: 30 168, JP-A-3 033 180, Feb. 13, 1991, 2 pages.

*Primary Examiner*—Thomas R. Weber
*Attorney, Agent, or Firm*—Oblon, Spivak, McClelland, Maier & Neustadt, P.C.

[57] ABSTRACT

A process is provided for preparing a polymer from an ethylenically unsaturated monomer, wherein the process provides reduced polymer scale deposition both in the liquid-phase region of the polymer vessel and on areas around the interface between the gas phase and the liquid phase, the process involving the use of a polymer vessel having a coating on at least its inner surfaces of a polymer scale preventive film prepared from a polymer scale preventive agent of a salt, either alkali metal, ammonium or both, of a sulfonation product of a condensate prepared from (A) an aromatic amine compound and (B) an aldehyde.

5 Claims, No Drawings

PROCESS OF PRODUCING POLYMER USING A POLYMER SCALE DEPOSITION PREVENTIVE AGENT

BACKGROUND OF THE INVENTION

1. Field of the Invention

The present invention relates to a polymer scale deposition preventive agent for use in polymerization of a monomer having an ethylenically unsaturated double bond, and a process for producing a polymer using the same.

2. Description of the Prior Art

Heretofore, processes for polymerization of a monomer having an ethylenically unsaturated double bond such as vinyl monomers are known, such as suspension, emulsion, solution, gas phase and bulk polymerization processes and the like. In any of these polymerization processes, polymer scale is liable to be deposited on the areas with which the monomer comes into contact, such as inner wall surfaces, stirring equipment and so on of a polymerization vessel.

The deposition of polymer scale results in disadvantages that the yield of the polymer and cooling capacity of the polymerization vessel are lowered, and that the polymer scale may peel off and mix into a polymeric product, thereby impairing the quality of the product. In addition, removal of the deposited polymer scale is very laborious and time-consuming, and since the polymer scale contains unreacted monomers (vinyl chloride and the like), it is accompanied by a risk of causing physical disorders in the operators, which has been a very serious problem in recent years.

For preventing polymer scale deposition, methods have been known, for example, a method in which a polymer scale deposition preventive agent comprising a polar organic compound such as amine compounds, quinone compounds, aldehyde compounds, etc. is applied to the polymerization vessel inner wall and so on and a method in which such compounds are added to an aqueous medium in which suspension polymerization is carried out (Japanese Patent Publication (KOKOKU) No. 45-30343).

However, according to these methods, although the polymer scale deposition preventive effect is exhibited while polymerization is repeated for up to about 5 or 6 batches, the effect diminishes if the number of repeated batches of polymerization exceeds 5 or 6 (that is, the scale deposition preventive effect is poor in durability). The disadvantage is emphasized particularly where a water-soluble catalyst is used for polymerization, and, therefore, these methods are unsatisfactory industrially.

For overcoming the above disadvantage, a polymer scale deposition preventive agent comprising a condensation product of an aromatic amine compound and an aromatic nitro compound (Japanese Patent Publication (KOKOKU) No. 60-30681) and a polymer scale preventive agent comprising a reaction product obtained by reacting a phenol compound with a reaction product of a hydrophilic functional group-containing aromatic amine and an aldehyde compound (Japanese Pre-examination Patent Publication No. 3-33180) have been proposed.

However, there is a drawback that polymer scale deposition occurs on the areas around the interface between the liquid phase and the gas phase located at the upper section of the interior of the polymerization vessel.

Once scale deposition has occurred on the areas around the interface between the gas and liquid phases, the scale will grow gradually as polymerization runs are repeated, and at last it may peel off to be incorporated into a polymeric product. When the polymeric product with the scale thus mixed therein is processed into products such as sheets or the like, many fish eyes are generated and thereby lowers seriously the quality thereof.

In the case of the polymer scale preventive agent comprising the condensation product of an aromatic amine compound and an aromatic nitro compound, if the coating film on the polymerization vessel inner wall, etc. is peeled off or dissolved and incorporated into a polymeric product, so-called initial discolaration which is generated when the polymeric product is worked into products like sheet, becomes strong and lowers the quality.

In the case of the polymer scale preventive agent comprising the condensation product of an aromatic amine compound and aromatic nitro compound, it is dissolved in an organic solvent or a mixed solvent of an organic solvent and water, containing the organic solvent as a major solvent, when used to form a coating film on the inner wall, etc. of a polymerization vessel, it is accompanied by a risk that the organic solvent may catch fire or explode, and a disadvantage that special care is required in handling due to its toxicity.

SUMMARY OF THE INVENTION

Accordingly it is an object of the present invention to provide a polymer scale deposition preventive agent that can prevent effectively the deposition of polymer scale, not only on the areas in the liquid phase region but also on the areas around the interface between the gas and liquid phases inside a polymerization vessel, that makes it possible to produce a polymer having a very small number of fish eyes and slight initial discoloration when being processed into products such as sheets or the like, and that is accompanied by no danger of an organic solvent catching fire or exploding and is safe in handling; and a process for producing a polymer using the same.

The first aspect of the present invention is a polymer scale deposition preventive agent for use in polymerization of a monomer having an ethylenically unsaturated double bond, comprising an alkali metal salt and/or ammonium salt of a sulfonation product of a condensate comprising (A) an aromatic amine compound and (B) an aldehyde compound as essential condensation components.

The second aspect of the present invention is a process for producing a polymer, which comprises polymerizing a monomer having an ethylenically unsaturated double bond in a polymerization vessel having a polymer scale preventive coating film on at least inner wall surfaces of the polymerization vessel, wherein the polymer scale preventive coating film comprises the polymer scale preventive agent as described above.

According to the present invention, deposition of polymer scale in a polymerization vessel can be effectively prevented, not only on the areas in the liquid-phase region but also on the areas around the interface between the gas phase and the liquid phase. Products such as sheets formed from the polymeric product have very few fish eyes, and have very little initial discoloration, and therefore are of high quality. The use of the agent makes it unnecessary to remove polymer scale for every polymerization run, thereby improving productivity.

DETAILED DESCRIPTION OF THE PREFERRED EMBODIMENTS

The present invention will now be described in detail.

Scale deposition preventive agent

Aromatic amine compound of component (A)

The aromatic amine compound of the component (A) used in the present invention includes, for example, the compounds of the following general formula (1):

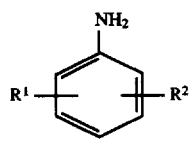

wherein $R^1$ is —H, —$NH_2$, —Cl, —OH, —$NO_2$, —$COCH_3$, —$OCH_3$, —$N(CH_3)_2$ or an alkyl group having 1 to 3 carbon atoms, and $R^2$ is —H, —$NH_2$, —OH, —$CH_3$, —COOH or —$SO_3H$;

the compounds having the general formula (2):

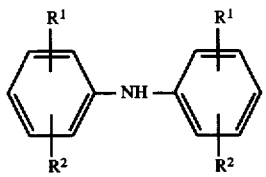

wherein the two $R^1$ may be the same or different and are each as defined above, and the two $R^2$ may be the same or different and are each as defined above;

the compounds having the general formula (3):

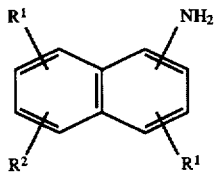

wherein the two $R^1$ may be the same or different and are each as defined above, and $R^2$ is as defined above; and the compounds having the general formula (4):

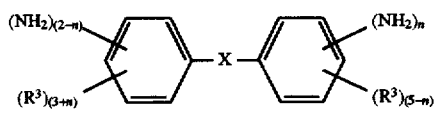

wherein plural $R^3$ may be the same or different and are each —H, —OH, —COOH, —$SO_3H$, —$NH_2$, —Cl, —$NO_2$, —$COCH_3$, —$OCH_3$, —$N(CH_3)_2$ or an alkyl group having 1 to 3 carbon atoms, X is an alkylene group having 1 to 5 carbon atoms, —$N(CH_3)$—, —$C(CH_3)_2$—, —CONH—, —P(=O)H—, —$SO_2$—, —O—, —S— or —$Si(R)_2$— (where R is an alkyl group having 1 to 10 carbon atoms), and n is an integer of 1 or 2.

Specifically, the compounds of the above general formula (1) include, for example, aniline, o-, m- and p-phenylenediamines, o-, m- and p-aminophenols, o-, m- and p-aminobenzenesulfonic acid, o-, m- and p-chloroanilines, o-, m- and p-nitroanilines, o-, m- and p-methylanilines, N,N-dimethyl-p-phenylenediamine, 4-chloro-o-phenylenediamine, 4-methoxy-o-phenylenediamine, 2-amino-4-chlorophenol, 2,3-diaminotoluene, 5-nitro-2-aminophenol, 2-nitro-4-aminophenol, 4-amino-2-aminophenol, and o-, m- and p-aminosalicylic acids.

Specific examples of the compounds of the above general formula (2) include 4-aminodiphenylamine, 2-aminodiphenylamine, 4,4'-diaminodiphenylamine, 4-amino-3'-methoxydiphenylamine, 4-amino-4'-hydroxydiphenylamine and the like.

Specific examples of the compounds of the above general formula (3) include α-naphthylamine, β-naphthylamine, 1,5-diaminonaphthalene, 1-amino-5-hydroxynaphthalene, 1,8-diaminonaphthalene, 2,3-diaminonaphthalene and the like.

Specific examples of the compounds represented by the above general formula (4) include 4,4'-diaminodiphenyl sulfide, 4,4'-diaminodiphenyl ether, 4,4'-diaminodiphenylpropane, 4,4'-diaminodiphenylsulfone, bis(4-aminophenyl)diethylsilane, bis(4-aminophenyl) phosphine oxide, bis(4-aminophenyl)-N-methylamine, 4,4'-diaminobenzanilide, 4,4'-diaminodiphenylmethane and the like.

Among the aromatic amine compounds (A), preferred are o-, m- and p-aminodiphenylamines, o-, m- and p-aminobenzenesulfonic acid, p-chloroaniline, o-, m- and p-aminosalicilic acids, 4-aminodiphenylamine, 2-aminodiphenylamine, 4,4'-diaminodiphenylamine, α-naphthylamine, 1,5-diaminonaphthalene, 1-amino-5-hydoroxynaphthalene, 1,8-diaminonaphthalene, 4,4'-diaminodiphenyl sulfone, 4,4'-diaminobenzanilide, 4,4'-diaminodiphenyl ether, 4,4'-diaminodiphenylmethane.

The aromatic amine compounds (A) may be used either singly or in combination of two or more.

Aldehyde compound of component (B)

The aldehyde compound of the component (B) to be used in the present invention is an organic compound having at least one, preferably one or two, aldehyde group (—CHO group) in the molecule. Examples of the aldehyde compound include the compound represented by the formula (5):

$$R^2-CHO \quad (5)$$

wherein $R^2$ is —H, —COOH, —CHO or a substituted or unsubstituted alkyl group having 1 to 5 carbon atoms;

the compound represented by the following general formula (6):

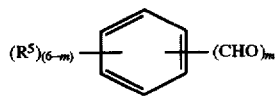

wherein $R^5$ is —H or —OH and when a plurality of $R^5$ are present, they may be the same or different, and m is an integer of 1 to 6; and the compound represented by the following general formula (7):

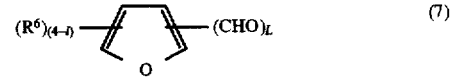

wherein $R^6$ is —H or an alkyl group having 1 to 5 carbon atoms and when a plurality of $R^6$ are present, they may be the same or different, and L is an integer of 1 to 4.

In the above compound represented by the general formula (5), the alkyl group defined in $R^2$ has preferably 1 to 4 carbon atoms. In the case where the alkyl group is substituted by a substituent, as the substituent there are exemplified methyl, ethyl, propyl and butyl groups, and the like.

Specific examples of the compound represented by the above general formula (5) include formaldehyde, acetaldehyde, glyoxylic acid, glyoxal propionaldehyde, butylaldehyde, isobutylaldehyde, valeraldehyde, isovaleraldehyde, pivalic aldehyde and caproaldehyde.

Specific examples of the compound represented by the above general formula (6) include benzaldehyde, salicylaldehyde, and phthalaldehyde.

In the above compound represented by the general formula (7), the alkyl group defined in $R^6$ has preferably 1 to 3 carbon atoms. Specific examples of the compound represented by the above general formula (7) include heterocyclic aldehydes such as furfural, 5-methyl-2-furaldehyde, β-furaldehyde, 5-ethyl-2-furaldehyde, 5-methyl-3-furaldehyde, 5-propyl-2-furaldehyde and 5-butyl-2-furaldehyde.

Among the above aldehyde compounds, preferred are formaldehyde, glyoxylic acid, benzaldehyde, salicylaldehyde and furfural.

The above aldehyde compounds can be used singly or in combination of two or more.

Preferably, said condensate used in the present invention further comprises (C) an aromatic hydroxyl compound described below as a condensation component.

(C) Aromatic hydroxyl compound

The aromatic hydroxyl compound of component (C) used in the present invention includes, for example, the compound of the following general formulas (8):

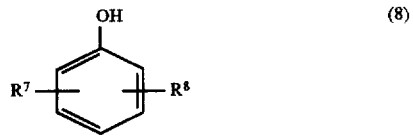

wherein $R^7$ is —H, —Cl, —OH, —COCH$_3$, —OCH$_3$, —COOH, —SO$_3$H or an alkyl group having 1 to 3 carbon atoms, and $R^8$ is —H, —Cl, —OH, —OCH$_3$, —OC$_2$H$_5$ or —COOH; the compounds having the following general formula (9):

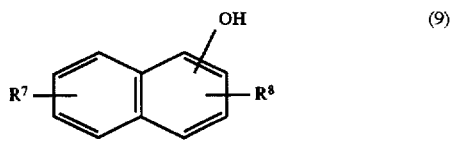

wherein $R^7$ and $R^8$ are as defined above; and the compounds having the general formula (10):

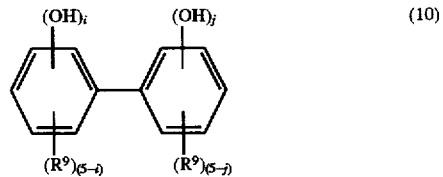

wherein $R^9$ is —H, —Cl, —Br, —OCH$_3$, —COOH, —SO$_3$H or an alkyl group having 1 to 3 carbon atoms, and where a plurality of $R^9$ exist, they may be the same or different, i is an integer of 1 to 5, and j is an integer of 0 to 5.

Specifically, the compounds of the above general formula (8) include, for example, phenol, hydroquinone, resorcinol, catechol, hydroxyhydroquinone, pyrogallol, and phenol derivatives such as o-, m- or p-chlorophenol, o-, m- or p-hydroxybenzoic acid, 2,4-, 2,5-, 2,6-, 3,4- and 3,5-dihydroxybenzoics acids, 2,5-, 2,6- and 3,5-dihydroxytoluenes and the like.

Specific examples of the compounds of the above general formula (9) include α-naphthol, β-naphthol, 1,3-, 1,4-, 1,5-, 2,3-, 2,6- and 2,7-dihydroxynaphthalenes, 1-hydroxy-2-naphthoic acid, 3-hydroxy-2-naphthoic acid and the like.

Specific examples of the compounds of the above general formula (10) include, for example, 2-hydroxybiphenyl, 3-hydroxybiphenyl, 4-hydroxybiphenyl, 2,2'-dihydroxybiphenyl, 3,3'-dihydroxybiphenyl, 4,4'-dihydroxybiphenyl, 2,2'-dihydroxy-5,5'-dimethylbiphenyl, 2,2'-dihydroxy-4,4',5,5'-tetramethylbiphenyl, 2,2'-dihydroxy-5,5'-dichlorobiphenyl and the like.

Among these aromatic hydroxyl compounds (C), preferred arehydroquinone, resorcinol, catechol, pyrogallol, α-naphthol, 2,7-dihydroxynaphthalene, 2-hydroxybiphenyl, 4-hydroxybiphenyl, 4,4'-dihydroxybiphenyl and bispyrogallol.

The aromatic hydroxyl compounds (C) may be used either singly or in combination of two or more.

Condensate

The condensate used in the present invention can be obtained by dispersing the aromatic amine compound, the component (A), and the aldehyde compound, the component (B), in water or an organic solvent, and allowing them to react optionally in the presence of a condensation catalyst, followed by purification.

The condensate of the aromatic amine compound (A), the aldehyde compound (B) and the aromatic hydroxyl compound (C) can be obtained by adding the component (C) to the reaction mixture in the course of the reaction of the components (A) and (B), or by allowing the component (C) to react with a condensation product of the components (A) and (B) (an amine/aldehyde condensate). Out of these, it is preferred to add the component (C) in the course of the reaction of the components (A) and (B), more preferably at the time when the conversion of the aromatic amine compound (A) is 30–99% by weight, still more preferably 60–95% by weight.

Said organic solvent includes, for example, alcohols, ketones, esters, tetrahydrofuran, dimethylformamide, 1,3-dimethyl-2-imidazoline and the like.

The condensation catalyst includes, for example, alkali metals such as sodium hydroxide, sodium potassium, ethylenediamine, and ethanolamine; acids such as hydrochloric acid, sulfuric acid and phosphoric acid; azo catalysts such as α,α'-azobisisobutyronitrile, α,α'-azobis-2,4-dimethylvaleronitrile and the like; elemental or molecular halogen such as iodine, bromine, chlorine and the like; peroxides such as hydrogen peroxide, sodium peroxide, benzoyl peroxide, potassium persulfate, ammonium persulfate, peracetic acid, cumene hydroperoxide, perbenzoic acid, p-menthane hydroperoxide and the like; oxygen acids and salts thereof such as iodic acid, periodic acid, potassium periodate, sodium perchlorate and the like.

The amount of the catalyst is not particularly limited but is normally in the range of 0.0005 to 0.3 mole, preferably 0.005 to 0.15 mole, per mole of the total of the reactants.

The ratio of the aromatic amine compound (A)/the aldehyde compound (B) is normally in the range of ⅕ to ⅟30, preferably ⅕ to ⅟10, on molar basis.

Where an aromatic hydroxyl compound (C) is used as a condensation component, the ratio of the aromatic amine compound (A)/the aldehyde compound (B) is in the range of normally ⅟0.1 to ⅟50, preferably ⅟0.5 to ⅕, and the aromatic amine compound (A)/the aromatic hydroxyl compound (C) is normally in the range of ⅟0.01 to ⅟10, preferably ⅟0.1 to ⅕.

The reaction temperature normally ranges from 10° to 100° C., preferably from 40° to 90° C. The time for reaction is normally from 0.1 to 100 hours, and preferably from 1.0 to 24 hours.

Purification of the condensate

The condensate is preferably purified prior to being subjected to sulfonation.

As the purification method for the resulting reaction mixture which contains the condensate, medium, unreacted aldehyde compound, etc., it is preferable to pour the mixture into water, to filter off the settled sediment and washing it with water, to recrystallize the thus washed matter from an organic solvent such as dimethylformamide, followed by filtration, washing with water and drying. If when the reaction mixture is poured into water, no sediment is obtained, the mixture should be added with an inorganic compound such as sodium chloride, calcium chloride or the like to carry out salting-out, followed by filtration and then thorough washing with water.

In the case of some condensates, said washing of the sediment is favorably performed with an organic solvent such as methanol, acetone and tetrahydrofuran rather than with water because a condensate with a higher purification can be obtained.

Sulfonation product and its alkali metal salts or ammonium salts

The polymer scale preventive agent of the present invention contains an alkali metal salt or ammonium salt of a sulfonation product of said condensate.

The sulfonation product is a compound obtained by sulfonating the condensate according to known methods. The sulfonation methods include, for example, the method in which a condensate is reacted with a sulfonating agent in an amount of 2 to 50 times the weight of condensate at 5° to 95° C. The sulfonating agents include sulfuric acid, fuming sulfuric acid, chlorosulfonic acid, etc.

The alkali metal salts or ammonium salts of the sulfonation product are compounds obtained by reacting said sulfonation product with an alkali metal compound or an ammonium compound. The reaction can be carried out by, for example, dispersing the sulfonation product in water and allowing them to react with art alkali metal compound or ammonium compound in a given amount by heating.

Said alkali metal salts include, for example, NaOH, KOH and $Na_2CO_3$.

Said ammonium compounds include, for example, $NH_4OH$, and $(NH_4)_2CO_3$.

The alkali metal salt or the ammonium compound should be normally used in an amount that is necessary to convert the sulfon groups of the sulfonation product into alkali metal salt or ammonium salt form, specifically in an equivalent amount, preferably in an amount of equivalent to 20 times the equivalent.

The temperature of reaction of the sulfonation product with the alkali metal compound or ammonium compound is preferably from 25° to 95° C.

The alkali metal salt or ammonium salt of the sulfonation product or mixtures thereof can be used as a polymer scale preventive agent for use in polymerization of an ethylenic double bond, as described below.

The alkali metal salt or ammonium salt of the sulfonation product is obtained in the form wherein it is dissolved in an aqueous medium. It may be stored or used in that form, or may be evaporated into dryness and then ground to be converted into a powder form which is advantageous for storing or transport.

The polymer scale preventive agent of the present invention more preferably comprises the alkali metal salt of the sulfonation product and a inorganic colloid (D) described below. Specifically, preferred are:

(1) embodiments containing:
   an alkali metal salt of the sulfonation product of the condensate of (A) an aromatic amine compound with (B) an aldehyde compound,
   and (D) an inorganic colloid;

(2) embodiments containing:
   an alkali metal salt of the sulfonation product of the condensate of (A) an aromatic amine compound, (B) an aldehyde compound and (C) an aromatic hydroxyl compound, and
   (D) an inorganic colloid; and (3) embodiments containing:
   an alkali metal salt of the sulfonation product of the condensate of (A) an aromatic amine compound with (B) an aldehyde compound,
   an alkali metal salt of the sulfonation product of the condensate of (A) an aromatic amine compound, (B) an aldehyde compound and (C) an aromatic hydroxyl compound, and
   (D) an inorganic colloid.

Inorganic colloid

The inorganic colloid used in the present invention contains colloidal particles which normally has a particle diameter of 1 to 500 nm, preferably from 4 to 200 nm, and specifically include, for example, ferric hydroxide colloids, silicate colloids, barium sulfate colloids, gold colloids, silver colloids, aluminum hydroxide colloids, sulfur colloids, titanium oxide colloids, antimony oxide colloids, antimony sulfate colloids, tin oxide colloids, iron ferricyanide colloids, iron ferrocyanide colloids, aluminum fluoride colloids and the like. Out of these, preferred are ferricoxide colloids, silicate colloids, aluminum hydroxide colloids, gold colloids and aluminum fluoride colloids.

The amount of the inorganic colloid is normally in the range of 50 to 5,000 parts by weight, preferably from 100 to 1,000 parts by weight, per 100 parts by weight of the alkali metal salt or ammonium salt of the sulfonation product of said condensate.

(Process of producing a polymer of a monomer having an ethylenic double bond, using said polymer scale deposition preventive agent)

The process of producing a polymer according to the present invention comprises polymerizing a monomer having an ethylenic double bond in a polymerization vessel having a coating film of said polymer scale deposition preventive agent on at least inner wall surfaces of the polymerization vessel.

Said coating film is formed by preparing a coating solution containing said scale deposition preventive agent, applying this solution to parts with which the monomer comes into contact during the polymerization, such as the inner wall surfaces of the polymerization vessel, and is preferably further applied to other parts on which polymer scale may be deposited followed by drying.

Preparation of Coating Liquid

The medium for use in preparation of the coating liquid used according to the process of the present invention, includes water and mixed solvents of water with an organic solvent miscible with water.

The organic solvent which is miscible with water includes, for example, alcohols such as methanol, ethanol, propanol, and the like; ketones such as acetone, methyl ethyl ketone, and the like; esters such as methyl acetate, ethyl acetate, and the like. These may be used either singly or as a mixed solvent of two or more thereof on a case-by-case basis.

In the case where a mixed solvent of water and an organic solvent miscible with water is used, the content of the organic solvent should be in a range such that danger of catching fire, explosion or the like can be obviated and that no problem in respect of handling due to toxicity or the like arises. Specifically, the content is preferably 50% by weight or less, and more preferably 30% by weight or less. If an organic solvent is contained in too large an amount, there will be a danger of catching fire, explosion or the like, and a problem in handling due to toxicity or the like.

To the coating liquid may be optionally added, for example, a cationic, nonionic or anionic surface active agents, and a pH adjuster such as phosphoric acid, perchloric acid, sulfuric acid, hydrochloric acid, nitric acid, phytic acid, acetic acid, p-toluenesulfonic acid, tannic acid, ethylenediamine, NaOH and the like, as long as the polymer scale preventing effects are not impaired.

Furthermore, to the coating liquid may be optionally added a water-soluble polymeric compounds such as hydroxyl group-containing polymeric compounds, cationic polymeric compounds, anionic polymeric compounds and amphoteric polymeric compounds.

The hydroxyl group-containing polymeric compounds include, for example, starches and their derivatives, such as amylose, amylopectin, dextrin, oxidized starch, acetyl starch, nitro starch, methyl starch, carboxymethyl starch, etc.; hydroxyl group-containing plant mucoids such as pectic acid, protopectic acid, pectinic acid, alginic acid, laminarin, fucoidin, agar-agar, carragheenin, etc.; hydroxyl group-containing animal mucoids such as hyaluronic acid, chondroitin sulfuric acid, heparin, keratosulfuric acid, chitin, chitosan, charonin sulfuric acid, limacoitin sulfuric acid, etc.; nucleic acids such as ribonucleic acid, deoxyribonucleic acid, etc.; cellulose derivatives such as methyl cellulose, ethyl cellulose, carboxymethyl cellulose, glycol cellulose, benzyl cellulose, cyanoethyl cellulose, methylene ether of cellulose, triphenyl methyl cellulose, formyl cellulose, cellulose acetate, cellulose propionate, cellulose butyrate, cellulose acetate propionate, cellulose sulfate, cellulose carbamate, nitrocellulose, cellulose phosphate, cellulose xanthogenate, etc.; hemicelluloses such as xylan, mannan, arabogalactan, galactan, araban, etc.; lignins such as alcohol lignin, dioxane lignin, phenol lignin, hydrotropic lignin, mercaptolignin, thio-alkali lignin, acid lignin, cuproxam lignin, periodate lignin, etc.; phenol-formaldehyde resins, partially saponified polyvinyl alcohols, polyvinyl alcohols, and so forth.

The cationic polymeric compounds include, for example, cationic polymeric electrolytes containing positively charged nitrogen atoms in side chains, such as polyvinylamines, polyethyleneamines, polyethyleneimines, polyacrylamides, N-vinyl-2-pyrrolidone/acrylamide copolymer, cyclized polymers of dimethyldiamylammonium chloride, cyclized polymers of dimethyldiethylammonium bromide, cyclized polymers of diallylamine hydrochloride, cyclized copolymers of dimetyldiallylammonium chloride and sulfur dioxide, polyvinylpyridines, polyvinylpyrrolidones, polyvinylcarbazoles, polyvinylimidazolines, polydimethylaminoethyl acrylates, polydimethylaminoethyl methacrylates, polydiethylaminoethyl acrylate, polydiethylaminoethyl methacrylate, and the like.

The anionic polymeric compounds include, for example, sulfomethylated products of polyacrylamide; polyacrylic acid; arginic acid, acrylamide-vinylsulfonic acid copoymer, polymethacrylic acid, polystyrenesulfonic acid, and the like and alkali metal salts and ammonium salts of these; and anionic polymeric compounds having a carboxyl group or sulfon group in its side chain(s) such as carboxymethyl cellulose.

The amphoteric polymeric compounds include, for example, gelatin, casein, albumin and the like.

To the coating liquid, an inorganic compound may be optionally added, as long as the scale preventing action is not impaired.

The inorganic compounds include for example silicic acids and silicates such as orthosilicic acid, metasilicic acid, mesodisilicic acid, mesotrisilicic acid, mesotetrasilicic acid, sodium orthosilicate, sodium disilicate, sodium tetrasilicate, water glass and the like; and metallic salts such as oxy acid salts, acetates, nitrates, hydroxides and halides of metals selected from the alkaline earth metal family metals such as magnesium, calcium, and barium, zinc family metals such as zinc, aluminum family metals such as aluminum, and platinum family metals such as platinum.

Formation of coating film

To form a coating film on inner wall surfaces of a polymerization vessel using the coating liquid prepared, first the coating liquid is applied to the inner wall surfaces of the polymerization vessel, and then the applied coating liquid is dried sufficiently at a temperature ranging, for example, from room temperature to 100° C., optionally followed by washing with water.

The coating liquid is preferably applied to not only the inner wall surfaces of a polymerization vessel but also other areas with which the monomer comes into contact during polymerization, including, for example, stirring blades, stirring shaft, baffles, condensers, headers, search coil, bolts, nuts, etc.

More preferably, the coating film is formed on the areas with which the monomer does not come into contact during polymerization but on which polymer scale may be deposited, for example, the inner surfaces, etc. of equipment and pipes of an unreacted monomer recovery system. Specifically, such areas include the inner surfaces of monomer distillation columns, condensers, monomer stock tanks, valves, and so on.

The formation of the coating film on the areas with which a monomer may come into contactor the other are as on which polymer scale may be deposited, prevents polymer scale from being deposited on the areas.

The method of applying the coating liquid to the inner wall surfaces of a polymerization vessel is not particularly restricted, and includes, for example, brush coating, spray coating, a method in which the polymerization vessel is filled with the coating liquid, followed by withdrawal thereof, and automatic coating methods as disclosed in Japanese Pre-examination Patent Publication (KOKAI) Nos. 57-61001 and 55-36288, Japanese Patent Publication (KOHYO) Nos. 56-501116 and 56-501117, and Japanese Pre-examination Patent Publication (KOKAI) NO. 59-11303, etc.

The method of drying performed after the application is also not restricted, including e.g. a method in which, after the coating liquid is applied, hot air with a suitable elevated temperature is blown to the coated surface; a method in which the inner wall surfaces of a polymerization vessel and the surfaces of other parts to be coated are preliminary heated to a temperature of, e.g., 30° to 80° C. and the coating liquid is directly applied to the heated surfaces; and so on. After being dried, the coated surfaces are washed with water if necessary.

The coating film obtained in this manner has a total coating weight, after being dried, of normally 0.001 g/m$^2$ or more, more preferably 0.05 to 2 g/m$^2$.

The application operation above performed every batch to every ten and several batches is sufficient. The formed coating film has good durability and retains the polymer scale-preventing action; therefore, the above-described application operation is not necessarily be carried out every batch of polymerization. Accordingly, productivity is improved.

Polymerization

After the formation of the coating film on the inner wall surfaces of a polymerization vessel, and preferably also on other areas with which monomer may come into contact during polymerization, etc. by the application operation as above, polymerization is carried out in accordance with conventional procedures. That is, a monomer having an ethylenically unsaturated double bond, a polymerization initiator (catalyst), and optionally a polymerization medium such as water, etc., a dispersing agent such as suspending agents, solid dispersing agents, nonionic or anionic emulsifying agents, etc., and the like are charged into the polymerization vessel, and then polymerization is conventionally carried out.

The monomers having an ethylenically unsaturated double bond which can be polymerized by applying the process of the present invention include, for example, vinyl halides such as vinyl chloride and the like; vinyl esters such as vinyl acetate, vinyl propionate and the like; acrylic acid, methacrylic acid, and their esters and salts; maleic acid, fumaric acid, and their esters and anhydrides; diene monomers such as butadiene, chloroprene, isoprene and the like; styrene; acrylonitrile; vinylidene halides; vinyl ethers; and so forth. These monomers may be used either singly or in combination of two or more.

There are no particular restrictions on the type of polymerization to which the process according to the present invention can be applied. That is, the process of the present invention is effective in any of such polymerization types as suspension polymerization, emulsion polymerization, solution polymerization, bulk polymerization, and gas phase polymerization. Particularly, the process is more suited to polymerization in an aqueous medium, such as suspension polymerization and emulsion polymerization.

In the following, taking the cases of suspension polymerization and emulsion polymerization as examples, general procedures of polymerization will be described.

First, water and a dispersing agent are charged into a polymerization vessel. Subsequently, the polymerization vessel is evacuated to reduce the internal pressure to a value of 0.1 to 760 mmHg, and a monomer is then charged, whereupon the internal pressure usually becomes a value of 0.5 to 30 kgf/cm$^2$.G. A polymerization initiator is charged into the vessel before and/or after charging the monomer. Subsequently, polymerization is carried out at a reaction temperature of 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50° to 150° C. The polymerization is considered to have been completed when the pressure inside the polymerization vessel has fallen to a level of 0 to 7 kgf/cm$^2$.G or when cooling water which is let to flow into and out of a jacket provided around the polymerization vessel has come to show an approximately equal temperature at the inlet and outlet (i.e., when liberation of heat due to polymerization reaction has subsided). The amounts of the water, dispersing agent and polymerization initiator to be charged for polymerization are normally 20 to 500 parts by weight, 0.01 to 30 parts by weight, and 0.01 to 5 parts by weight, respectively, per 100 parts by weight of the monomer.

In solution polymerization, an organic solvent such as toluene, xylene, pyridine, etc. is used as a polymerization medium, in place of water. A dispersing agent may be used optionally. The other conditions for polymerization are generally the same as those described for suspension and emulsion polymerizations.

In bulk polymerization, after a polymerization vessel is evacuated to a pressure of about 0.01 mmHg to about 760 mmHg, a monomer and a polymerization initiator are charged into the polymerization vessel, and then polymerization is carried out at a reaction temperature of −10° C. to 250° C. For example, the reaction temperature is 30° to 80° C. for polymerization of vinyl chloride, and is 50° to 150° C. for polymerization of styrene.

Where polymerization is carried out by applying the method of preventing polymer scale deposition according to the present invention, it is possible to prevent polymer scale from being deposited, regardless of the materials of the inner wall, etc. of a polymerization vessel. For example, where the polymerization vessel is made of a stainless steel or other steel as well as where the polymerization vessel is a glass-lined one or the like, the polymer scale deposition can be prevented from occurring.

The additive materials which have been conventionally added in polymerization systems can be used without any limitations. That is to say, the process of the present invention can effectively prevent polymer scale deposition in polymerization systems which may contain additive materials including, for example, polymerization initiators such as t-butyl peroxyneodecanoate, bis (2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxyethyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, p-menthane hydroperoxide, etc.; suspending agents comprised of, for example, natural or synthetic polymeric compounds such as partially saponified polyvinyl alcohols, polyacrylic acids, vinyl acetate/maleic anhydride copolymers, cellulose derivatives (e.g. hydroxypropyl methyl cellulose), gelatin, etc.; solid dispersing agents such as calcium phosphate, hydroxy apatite, etc.; nonionic emulsifying agents such as sorbit an monolaurate, sorbitantrioleate, polyoxyethylenealkyl ether, etc.; anionic emulsifying agents such as sodium lauryl sulfate, sodium alkylbenzenesulfonates (e.g. sodium dodecylbenzenesulfonate), sodium dioctylsulfosuccinate, etc.; fillers such as calcium carbonate, titanium oxide, etc.; stabilizers such as tribasic lead sulfate, calcium stearate, dibutyltin dilaurate, dioctyltin mercaptide, etc.; lubricants such as rice wax, stearic acid, cetyl alcohol, etc.; plasticizers such as DOP, DBP, etc.; chain transfer agents such as mercaptans (e.g. t-dodecyl mercaptan), trichloroethylene, etc.; pH adjusters, and so forth.

In addition to being used for formation of the coating film on the inner wall surfaces, etc. of the polymerization vessel, the polymer scale deposition preventive agent of the present invention may further be added directly to the polymerization system, whereby the effect of preventing deposition of polymer scale can be enhanced. In that case, the amount of the agent to be added suitably ranges from about 10 to about 1000 ppm based on the total weight of the monomer or monomers charged into the polymerization vessel. At the time of adding the polymer scale deposition preventive agent, care should be taken not to affect adversely the quality of the resulting polymeric product in fish eyes, bulk specific gravity, particle size distribution, etc.

EXAMPLES

The present invention will now be described specifically, with reference to working examples.

Production Examples

Production of Condensation product No. 1

An autoclave is charged with 300 mole of methanol, one mole of 4-aminodiphenylamine, and 3 mole of benzaldehyde, and they were stirred at room temperature, so that 4-aminodiphenylamine and benzaldehyde were dissolved in methanol.

To the methanol solution thus obtained was added 100 g of 1% aqueous sodium hydroxide solution, and the mixture obtained was heated at 75° C. for one hour. After that, a solution of 0.5 mole of bispyrogallol as an aromatic hydroxyl compound (C) dissolved in 100 mole of methanol was added.

At the time above, the condensation conversion of the aromatic amine compound (A)was measured according to the method below to find 94% by weight. After the addition of the bispyrogallol solution in methanol, reaction was continued for another five hour. After the completion of the reaction, the reaction mixture was cooled and then mixed with water in an amount of five times that of the mixture.

wherein a stands for the amount of the aromatic amine compound charged.

Production of Condensation Product Nos. 2 to 14

The combinations of an aromatic amine compound, aldehyde compound and aromatic hydroxyl compound as given in Table 1 were each subjected to condensation reaction in the same manner as in the production of Condensation Product No. 1, to thereby produce Condensation Product Nos. 2 to 14. No. 2 is a comparative example in which no aromatic amine compound was used, No. 3 is a comparative example in which no aldehyde compound was used, and No. 4 is an experimental example in which an aromatic hydroxyl compound (C) was added simultaneously with the addition of an aromatic amine compound (A) and an aldehyde compound (B) and reacted. In Table 1 the conversion of (A) at the time (C) was added is also given. In Table 1, mole number is given in parentheses (the same is applied hereinafter).

Production of Condensation Product No. 15–20

In each experiment, an autoclave is charged with an aromatic amine compound, aldehyde compound, N, N-dimethylformamide (50 mole) and 5% aqueous sodium hydroxide solution (50 g), and they were heated and reacted at 50° C. for five hours. After the completion of the reaction, the reaction mass was cooled and mixed with water in an amount which was five times that of the reaction mass. Subsequently, 30 g of sodium chloride was added to and mixed with the mass under stirring, to perform salting-out of a condensation product. The sediment thus precipitated was filtered off, washed with water thoroughly, and dried to give the condensation product (Nos. 15 to 20).

TABLE 1

| Reaction product No. | (A) Aromatic amine Compound (mole) | (B) Aldehyde compound (mole) | (C) Aromatic hydroxyl compound (mole) | Conversion of (A) when (C) was added (wt. %) |
|---|---|---|---|---|
| 1 | 4-Aminodiphenylamine (1) | Benzaldehyde (3) | Bispyrogallol (0.5) | 94 |
| 2* | — | Benzaldehyde (3) | Bispyrogallol (0.5) | — |
| 3* | 4-Aminodiphenylamine (1) | — | Bispyrogallol (0.5) | — |
| 4 | 4-Aminodiphenylamine (1) | Benzaldehyde (3) | Bispyrogallol (0.5) | 0 |
| 5 | p-Aminosulfonic acid (1) | Formaldehyde (10) | Catechol (1) | 65 |
| 6 | 4,4'-Diaminodiphenylsulfon (1) | Furfural (10) | Pyrogallol (1) | 78 |
| 7 | 1,5-Diaminonaphthalene (1) | Salicylaldehyde (5) | α-Naphthol (0.5) | 90 |
| 8 | α-Naphrhylamine (1) | Formaldehyde (4) | Resorcinol (2) | 98 |
| 9 | 4,4'-Diaminobenzanilide (1) | Formaldehyde (4) | Catechol (2) | 92 |
| 10 | p-Aminophenol (1) | Formaldehyde (3) | 4-Hydroxybiphenyl (3) | 69 |
| 11 | p-Phenylenediamine (1) | Formaldehyde (3) | 2,7-Dihydroxynaphthalene (1) | 84 |
| 12 | 1,8-Diaminonaphthalene (1) | Formaldehyde (10) | Hydroquinone (0.5) | 88 |
| 13 | 4-Aminodiphenylamine (1) | Formaldehyde (9) | 4,4'-Dihydroxybiphenyl (2) | 70 |
| 14 | p-Amino salicylic acid (1) | Formaldehyde (9) | Pyrogallol (0.5) | 94 |
| 15 | 4-Aminodiphenylamine (1) | Formaldehyde (5) | — | — |
| 16 | p-Aminosulfonic acid (1) | Benzaldehyde (5) | — | — |
| 17 | 4,4'-Diaminodiphenyl ether (1) | Glyoxylic acid (9) | — | — |
| 18 | 1,5-Diaminonaphthalene (1) | Benzaldehyde (9) | — | — |
| 19 | p-Chloroaniline (1) | Benzaldehyde (5) | — | — |
| 20 | 1-Amino-5-hydroxy-naphthalene | Benzaldehyde (3) | — | — |

The sediment formed was filtered off, washed with water, and dried, and a condensation product (No. 1) was thereby obtained.

Measurement of condensation conversion:

The amount (b) of the unreacted aromatic amine compound (4-aminodiphenylamine in the example) was determined by liquid chromatography, and the condensation conversion was calculated according to the equation below:

Condensation conversion (% by weight)=[(a−b)/a]×100

Production of Condensate Sulfonation Product Salt No. 1

100 g of Condensation Product No. 1 and 500 g of concentrated sulfuric acid were mixed and then heated to 90° C. and stirred at that temperature for 10 hours to effect sulfonation. The reaction solution was poured into two liters of water, and then the settled sulfonation product was filtered off, washed with water, dispersed in one liter of water, and then dissolved therein by adding 11.5 g of 40% by weight aqueous NaOH solution. Subsequently, the solution was evaporated to dryness, followed by grinding to produce 68 g of Salt No. 1 (sodium salt) of sulfonation product of the condensate.

Production of Sulfonation Product Salt Nos. 2–20

From each of Condensate Product Nos. 2–20, a salt of sulfonation product of a condensation product was obtained using a sulfonating agent given in Table 2 and analkaline metal compound or ammonium compound given in the same table [Nos. 2–11 and 16–20: alkali metal salts; Nos. 12–15: ammonium salts].

acted monomer were recovered, and the inside of the polymerization vessel was washed with water to remove residual resin.

The above process from applying the coating liquid through carrying out polymerization to washing with water was repeated batchwise 25 times. After 25th batch was over, the amount of polymer scale deposited was measured according to the method below. The polymer scale amount in the experiments were measured both at liquid phase part

TABLE 2

| Surfonation product No. | Condensation Product No. | Surfonating agent | Condensation product/ surfonating agent (wt. ratio) | Reaction Temperature (°C.) | Reaction time (hrs) | Alkaline compound |
|---|---|---|---|---|---|---|
| 1 | 1 | Surfuric acid | 100/500 | 90 | 10 | NaOH |
| 2* | 2* | Surfuric acid | 100/500 | 90 | 10 | NaOH |
| 3* | 3* | Surfuric acid | 100/500 | 90 | 10 | NaOH |
| 4 | 4 | Surfuric acid | 100/500 | 90 | 10 | NaOH |
| 5 | 5 | Surfuric acid | 100/500 | 90 | 10 | NaOH |
| 6 | 6 | Surfuric acid | 100/500 | 90 | 10 | KOH |
| 7 | 7 | Surfuric acid | 100/500 | 90 | 10 | KOH |
| 8 | 8 | Surfuric acid | 100/300 | 120 | 8 | KOH |
| 9 | 9 | Chlorosurfonic acid | 100/300 | 10 | 30 | KOH |
| 10 | 10 | Chlorosurfonic acid | 100/300 | 30 | 50 | NaOH |
| 11 | 11 | Chlorosurfonic acid | 100/500 | 50 | 20 | NaOH |
| 12 | 12 | Surfuric acid | 100/200 | 70 | 15 | NH$_4$OH |
| 13 | 13 | Surfuric acid | 100/1000 | 30 | 70 | NH$_4$OH |
| 14 | 14 | Surfuric acid | 100/500 | 50 | 40 | NH$_4$OH |
| 15 | 15 | Surfuric acid | 100/200 | 50 | 30 | NH$_4$OH |
| 16 | 16 | Surfuric acid | 100/100 | 50 | 30 | NaOH |
| 17 | 17 | Fuming surfuric acid | 100/500 | 5 | 30 | NaOH |
| 18 | 18 | Fuming surfuric acid | 100/500 | 10 | 10 | NaOH |
| 19 | 19 | Surfuric acid | 100/300 | 50 | 40 | NaOH |
| 20 | 20 | Surfuric acid | 100/300 | 50 | 40 | NaOH |

Example 1

Experiment Nos. 101–121

In each experiment, a stainless-steel polymerization vessel having an internal capacity of 1,000 liters and equipped with a stirrer was used to carry out polymerization, as described below. The sulfonation product salt, inorganic colloid, solvent and pH adjuster used in each experiment are given in Table 3. The inorganic colloids used in experiments below had particle diameters as given in Table 5.

In each experiment, firstly, a sulfonation product salt and an inorganic colloid were dissolved and/or dispersed in a solvent so that the total concentration might become the value as given in Table 3, and optionally a pH adjuster was used as necessary to prepare a coating liquid.

The coating liquid was applied to the inner wall, stirring shaft and other parts with which the monomer comes into contact during polymerization, and the coating liquid thus applied was dried by heating at 50° C. for 10 minutes to form a coating film, followed by washing with water.

In Table 3 Experiment Nos. 102–103 marked with * are comparative examples in which a coating solution not meeting the requirements of the present invention was applied.

Subsequently, in the polymerization vessel having the coating film formed by the application treatment as above was charged with 400 kg of water, 200 kg of vinyl chloride, 200 g of a partially saponified polyvinyl alcohol, 30 g of hydroxypropyl methyl cellulose and 70 g of 3,5,5-trimethylhexanoyl peroxide, followed by carrying out polymerization with stirring at 66° C. for 5 hours. After the polymerization was finished, a polymeric product and unreand around the interface between the gas phase part and liquid phase part. The results are given in Table 4.

The polymer obtained in each Experiment was formed into sheet, and fish eyes were measured according to the method below. The results are given in Table 4.

Measurement of the amount of polymer scale deposited

The scale deposited in an area of 10 cm square was scraped off with a spatula as completely as can be confirmed with the naked eye, and then the scraped scale was weighed on a balance. The measured value was multiplied by 100 to obtain the amount of the deposited polymer scale per area of 1 m$^2$.

Measurement of fish eyes

A hundred (100) parts by weight of a polymer obtained, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black were mixed. The resulting mixture was kneaded at 150° C. for 7 minutes with 6 inch rolls, and then formed into a sheet 0.2 mm thick. The obtained sheet was examined for the number of fish eyes per 100 cm$^2$ by light transmission.

Further, measurement of luminosity index (L value) of a sheet formed from a polymer obtained in each experiment was carried out, according to the method below. The results are given in Table 4.

Measurement of luminosity index (L value)

A hundred (100) parts by weight of an obtained polymer, 1 part by weight of a tin laurate stabilizing agent (TS-101, product of Akisima Chemical Co.) and 0.5 part by weight of a cadmium stabilizingagent (C-100J, product of Katsuta Kako Co.), and 50 parts by weight of dioctyl phthalate as a plasticizer were kneaded at 160° C. for 5 minutes with a twin roll mill, and then formed into a sheet t mm thick. Subsequently, this sheet was placed in a molding frame measuring 4×4×1.5 cm, heated at 160° C. under a pressure of 65 to 70 kgf/cm² to prepare a test specimen. This test specimen was measured for luminosity index L in the Hunter's color difference equation described in JIS Z 8730 (1980). The greater the value of L, the higher the whiteness is evaluated, namely, the slighter the initial discoloration is evaluated.

The value of L is determined as follows.

The stimulus value Y of XYZ color system is determined by the photoelectric tristimulus colorimetry using the standard light C, photoelectric colorimeter (Color measuring color difference meter Model Z-1001DP, product of Nippon Denshoku Kogyo K.K.) in accordance with JIS Z 8722. As the geometric condition of illumination and light reception, the condition d defined in section 4.3.1 of JIS Z 8722 is adopted. From the stimulus value Y obtained, the L value is calculated based on the equation: $L=10Y^{1/2}$ described in JIS Z 8730 (1980).

TABLE 4

| | Results after 25th batch | | | |
|---|---|---|---|---|
| | Polymer scale amount (g/m²) | | | |
| Exp. No. | Liquid phase | Around interface between gas and liquid phases | No. of Fish eyes | Luminosity index (L) |
| 101 | 0 | 3 | 2 | 72.5 |
| 102* | 60 | 300 | 27 | 70.1 |
| 103* | 95 | 320 | 28 | 70.2 |
| 104 | 0 | 17 | 7 | 72.5 |
| 105 | 0 | 3 | 2 | 72.5 |
| 106 | 0 | 1 | 3 | 72.5 |
| 107 | 0 | 4 | 2 | 72.5 |
| 108 | 0 | 3 | 2 | 72.5 |
| 109 | 0 | 3 | 2 | 72.5 |
| 110 | 0 | 3 | 2 | 72.5 |
| 111 | 0 | 4 | 2 | 72.5 |
| 112 | 0 | 3 | 2 | 72.5 |
| 113 | 0 | 16 | 6 | 72.5 |
| 114 | 0 | 15 | 5 | 72.5 |
| 115 | 0 | 37 | 9 | 72.5 |
| 116 | 0 | 45 | 9 | 72.5 |
| 117 | 0 | 17 | 7 | 72.5 |

TABLE 3

| Exp. No. | Sulfonation Product No. | (D) Inorganic colloid | Total conc. of Sufonation product + (D) (%) | Wt. ratio Sulfonation product/(D) | Solvent (wt. ratio) | pH adjuster (pH) |
|---|---|---|---|---|---|---|
| 101 | 1 | Silicate colloid | 0.3 | 100/50 | Water/MeOH (70/30) | Phosphoric acid (3.0) |
| 102* | 2* | Silicate colloid | 0.3 | 100/50 | Water/MeOH (70/30) | Phosphoric acid (3.0) |
| 103* | 3* | Silicate colloid | 0.3 | 100/50 | Water/MeOH (70/30) | Phosphoric acid (3.0) |
| 104 | 4 | Silicate colloid | 0.3 | 100/50 | Water/MeOH (70/30) | Phosphoric acid (3.0) |
| 105 | 5 | Silicate colloid | 0.3 | 100/100 | Water/EtOH (80/20) | Hydrochloric acid (2.5) |
| 106 | 6 | Ferric hydroxide colloid | 0.4 | 100/200 | Water/MeOH (80/20) | Phytic acid (3.0) |
| 107 | 7 | Sulfur colloid | 0.8 | 100/500 | Water/MeOH (80/20) | Tannic acid (3.0) |
| 108 | 8 | Aluminum fluoride colloid | 0.3 | 100/500 | Water/MeOH (80/20) | Sulfuric acid (3.0) |
| 109 | 9 | Silicate colloid | 0.3 | 100/400 | Water/MeOH (80/20) | Phosphoric acid (2.5) |
| 110 | 10 | Aluminum hydroxide colloid | 0.3 | 100/100 | Water/Acetone (90/10) | Perchloric acid (2.5) |
| 111 | 11 | Silver colloid | 0.3 | 100/200 | Water/Acetone (90/10) | Perchloric acid (2.5) |
| 112 | 12 | Gold colloid | 0.5 | 100/200 | Water/Acetone (90/10) | Perchloric acid (2.5) |
| 113 | 13 | None | 0.5 | 100/— | Water/Acetone (90/10) | Perchloric acid (2.5) |
| 114 | 14 | None | 0.3 | 100/— | Water/MeOH (60/40) | Sulfuric acid (2.0) |
| 115 | 15 | None | 0.3 | 100/— | Water/MeOH (60/40) | Sulfuric acid (2.0) |
| 116 | 16 | None | 0.3 | 100/— | Water/MeOH (60/40) | Sulfuric acid (2.0) |
| 117 | 17 | Silicate colloid | 0.5 | 100/500 | Water/MeOH (60/40) | Tannic acid (2.0) |
| 118 | 18 | Gold colloid | 0.3 | 100/200 | Water/MeOH (60/40) | Tannic acid (2.0) |
| 119 | 19 | Silver colloid | 0.3 | 100/100 | Water/MeOH (60/40) | Tannic acid (2.0) |
| 120 | 20 | None | 0.3 | 100/— | Water/MeOH (60/40) | Tannic acid (2.0) |
| 121* | 1 | None | 0.3 | 100/— | Water/MeOH (60/40) | Tannic acid (2.0) |

TABLE 4-continued

Results after 25th batch

Polymer scale amount (g/m²)

| Exp. No. | Liquid phase | Around interface between gas and liquid phases | No. of Fish eyes | Luminosity index (L) |
| --- | --- | --- | --- | --- |
| 118 | 0 | 16 | 6 | 72.5 |
| 119 | 0 | 18 | 7 | 72.5 |
| 120 | 0 | 39 | 9 | 72.5 |
| 121 | 0 | 17 | 6 | 72.5 |

TABLE 5

| Colloid | Diameter of particles (nm) |
| --- | --- |
| Aluminum fluoride colloid | 30–100 |
| Silicate colloid | 10–20 |
| Aluminum hydroxide colloid | 20–50 |
| Iron oxide colloid | 20–50 |
| Gold colloid | 10–20 |
| Silver colloid | 10–20 |
| Sulfur colloid | 20–50 |

Example 2

Experiment Nos. 201 to 221

A stainless-steel polymerization vessel having an internal capacity of 100 liters and equipped with a stirrer was used for polymerization as described below. In each experiment, the sulfonation product salt, inorganic colloid, solvent and pH adjuster as set forth in Table 6 were mixed in such amounts as to give the concentration and pH shown in the same Table 6 to prepare a coating solution.

The coating liquid thus prepared was applied to the inner wall, stirring shaft, stirring blades of the polymerization vessel and other parts with which the monomer comes into contact during polymerization, to form a coating film, followed by washing with water, in the same manner as in Example 1.

Experiment Nos. 202–203 marked with * in Table 6 are comparative experiments in which a coating liquid not meeting the requirements of the present invention was applied.

The polymerization vessel having been treated as above was charged with 45 kg of water, 1.1 kg of sodium dodecylbenzenesulfonate, 60 g of t-dodecyl mercaptan and 65 g of potassium peroxodisulfate. After the inside of the polymerization vessel was replaced with nitrogen gas, 6.5 kg of styrene and 19 kg of butadiene were charged into the vessel, and polymerization was carried out at 50° C. for 15 hours. After the polymerization was completed, the polymeric product and unreacted monomers were recovered, followed by washing the inside of the vessel with water to remove residual resin.

Thereafter, the above process from applying a coating liquid through carrying out polymerization to washing with water was repeated batchwise 15 times. After the 15th polymerization batch was over, the amount of polymer scale deposited was measured on a liquid phase part (an area of the inner wall of the polymerization vessel which was located in the liquid phase during polymerization) and around the interface between gas and liquid phases according to the method below. The results are given in Table 7.

Measurement of luminosity index (L value)

To 1 kg of the polymer latex obtained was added 1 kg of 2% magnesium sulfate solution to cause aggregation and sedimentation. The sediment was filtered off, washed with a hot water at 80° to 90° C. twice or three times and dried at 40° C. for 25 hours in a vacuum dryer to give a resin. The resin was placed in a molding frame measuring 9×9 cm and having a thickness of 0.1 cm, heated at 195° C. under a pressure of 50 to 60 kgf/cm² for 0.2 hour and press-molded under a final pressure of 80 kgf/cm² to prepare a test specimen. This test specimen was measured for luminosity index L in the same manner as in Example 1.

TABLE 6

| Exp. No. | Sulfonation Product No. | (D) Inorganic colloid | Total conc. of Sufonation product + (D) (%) | Wt. ratio Sulfonation product/(D) | Solvent (wt. ratio) | pH adjuster (pH) |
| --- | --- | --- | --- | --- | --- | --- |
| 201 | 1 | Silicate colloid | 0.5 | 100/200 | Water/MeOH (60/40) | Perchloric acid (2.5) |
| 202* | 2* | Silicate colloid | 0.5 | 100/200 | Water/MeOH (60/40) | Perchloric acid (2.5) |
| 203* | 3* | Silicate colloid | 0.5 | 100/200 | Water/MeOH (60/40) | Perchloric acid (2.5) |
| 204 | 4 | Silicate colloid | 0.5 | 100/200 | Water/MeOH (60/40) | Perchloric acid (2.5) |
| 205 | 5 | Silicate colloid | 0.5 | 100/100 | Water/MeOH (70/30) | Perchloric acid (2.5) |
| 206 | 6 | Silicate colloid | 0.5 | 100/50 | Water/MeOH (70/30) | Phosphoric acid (2.5) |
| 207 | 7 | Ferric hydroxide colloid | 0.5 | 100/300 | Water/MeOH (70/30) | Phosphoric acid (2.5) |
| 208 | 8 | Ferric hydroxide colloid | 0.5 | 100/500 | Water/MeOH (70/30) | Phosphoric acid (2.5) |
| 209 | 9 | Ferric hydroxide colloid | 0.3 | 100/400 | Water/MeOH (70/30) | Phosphoric acid (2.5) |
| 210 | 10 | Ferric hydroxide colloid | 0.3 | 100/50 | Water/MeOH (80/20) | Phosphoric acid (2.5) |
| 211 | 11 | Sulfur colloid | 0.3 | 100/50 | Water/MeOH (80/20) | Phytic acid (2.5) |
| 212 | 12 | Sulfur colloid | 0.3 | 100/100 | Water/MeOH (80/20) | Phytic acid (2.5) |

TABLE 6-continued

| Exp. No. | Sulfonation Product No. | (D) Inorganic colloid | Total conc. of Sulfonation product + (D) (%) | Wt. ratio Sulfonation product/(D) | Solvent (wt. ratio) | pH adjuster (pH) |
|---|---|---|---|---|---|---|
| 213 | 13 | Sulfur colloid | 0.4 | 100/100 | Water/MeOH (80/20) | Phytic acid (2.5) |
| 214 | 14 | Sulfur colloid | 0.4 | 100/100 | Water/MeOH (80/20) | Phytic acid (2.5) |
| 215 | 15 | Silicate colloid | 0.3 | 100/300 | Water/MeOH (80/20) | Tannic acid (2.0) |
| 216 | 16 | Gold colloid | 0.3 | 100/200 | Water/MeOH (80/20) | Tannic acid (2.0) |
| 217 | 17 | Silver colloid | 0.5 | 100/100 | Water/MeOH (60/40) | Tannic acid (2.0) |
| 218 | 18 | Aluminum fluoride colloid | 0.5 | 100/40 | Water/MeOH (70/30) | Tannic acid (2.0) |
| 219 | 19 | Silicate colloid | 0.5 | 100/30 | Water/MeOH (80/20) | Sulfuric acid (2.0) |
| 220 | 20 | None | 0.5 | 100/— | Water/MeOH (90/10) | Sulfuric acid (2.0) |
| 221 | 1 | None | 0.5 | 100/— | Water/MeOH (90/10) | Sulfuric acid (2.0) |

TABLE 7

Results after 15th batch

| | Polymer scale amount (g/m$^2$) | | |
|---|---|---|---|
| Exp. No. | Liquid phase | Around interface between gas and liquid phases | Luminosity index (L) |
| 201 | 0 | 4 | 85.0 |
| 202* | 110 | 210 | 82.1 |
| 203* | 150 | 340 | 82.3 |
| 204 | 0 | 32 | 85.0 |
| 205 | 0 | 5 | 85.0 |
| 206 | 0 | 4 | 85.0 |
| 207 | 0 | 5 | 85.0 |
| 208 | 0 | 4 | 85.0 |
| 209 | 0 | 4 | 85.0 |
| 210 | 0 | 5 | 85.0 |
| 211 | 0 | 4 | 85.0 |
| 212 | 0 | 4 | 85.0 |
| 213 | 0 | 5 | 85.0 |
| 214 | 0 | 18 | 85.0 |
| 215 | 0 | 13 | 84.9 |
| 216 | 0 | 16 | 84.9 |
| 217 | 0 | 15 | 84.9 |
| 218 | 0 | 13 | 84.9 |
| 219 | 0 | 17 | 84.9 |
| 220 | 0 | 34 | 84.6 |
| 221 | 0 | 16 | 84.7 |

What is claimed is:

1. A process for producing a polymer, which comprises polymerizing a monomer having an ethylenically unsaturated double bond in a polymerization vessel having a polymer scale preventive coating film on at least inner wall surfaces of the polymerization vessel, wherein the polymer scale preventive coating film comprises a polymer scale preventive agent comprising a salt of a sulfonation product of a condensate comprising (A) an aromatic amine compound and (B) an aldehyde compound as essential condensation components, wherein said salt is an alkali metal salt ammonium salt or a mixture thereof.

2. The process of claim 1, wherein the polymerization vessel further has the coating film on other areas with which the monomer comes into contact during polymerization.

3. The process of claim 1, wherein the coating film is further formed on the inner surfaces of equipment and pipes of an unreacted monomer recovery system.

4. The process of claim 1, wherein said polymerization is conducted as suspension polymerization, emulsion polymerization, solution polymerization, bulk polymerization or gas phase polymerization.

5. The process of claim 1, wherein said monomer is selected from the group consisting of vinyl esters; vinyl halides; acrylic acid, methacrylic acid and their esters and salts; maleic acid, fumaric acid and their esters and anhydrides; diene monomers; styrene; acrylonitrile; vinylidene halides; and vinyl ethers.

* * * * *

UNITED STATES PATENT AND TRADEMARK OFFICE
CERTIFICATE OF CORRECTION

PATENT NO. : 5,723,553
DATED : MARCH 3, 1998
INVENTOR(S) : MIKIO WATANABE ET AL.

It is certified that error appears in the above-indentified patent and that said Letters Patent is hereby corrected as shown below:

On the Title page, delete item [75] in its entirety and insert therefor
--[75] Inventors: Mikio Watanabe, Ibaraki-ken; Toshihide Shimizu, Urayasu, both of Japan--.

Signed and Sealed this

Eighteenth Day of August, 1998

*Attest:*

BRUCE LEHMAN

*Attesting Officer*     *Commissioner of Patents and Trademarks*